United States Patent
Matumoto et al.

(10) Patent No.: US 7,190,640 B2
(45) Date of Patent: Mar. 13, 2007

(54) POWER CONTROL FOR ELECTRONIC EQUIPMENT HAVING A PLURALITY OF PANELS PROVIDED OPPOSITELY BACKWARD AND FORWARD

(75) Inventors: Isao Matumoto, Saitama (JP); Hironori Kobayashi, Saitama (JP); Norifumi Nishida, Saitama (JP); Makoto Fukuya, Saitama (JP)

(73) Assignee: Pioneer Corporation, Tokyo (JP)

( * ) Notice: Subject to any disclaimer, the term of this patent is extended or adjusted under 35 U.S.C. 154(b) by 358 days.

(21) Appl. No.: 10/317,118

(22) Filed: Dec. 12, 2002

(65) Prior Publication Data

US 2003/0120398 A1    Jun. 26, 2003

(30) Foreign Application Priority Data

Dec. 21, 2001  (JP)  ............................ P2001-390551

(51) Int. Cl.
    *H04B 1/08*    (2006.01)
(52) U.S. Cl. .............................................. 369/6; 369/12
(58) Field of Classification Search .................... 369/6, 369/12, 10
    See application file for complete search history.

(56) References Cited

U.S. PATENT DOCUMENTS

| | | | |
|---|---|---|---|
| 4,380,809 A | | 4/1983 | Sato |
| 4,623,992 A | * | 11/1986 | Kurosaki et al. .............. 369/6 |
| 5,007,104 A | | 4/1991 | Brochu |
| 5,177,730 A | * | 1/1993 | Utsugi ......................... 720/646 |
| 5,554,966 A | * | 9/1996 | Iijima et al. ................. 340/687 |
| 5,815,468 A | | 9/1998 | Muramatsu et al. |
| 6,075,510 A | * | 6/2000 | Blouin et al. ................. 345/99 |
| 6,424,844 B1 | * | 7/2002 | Lundqvist ................... 455/566 |
| 2003/0080954 A1 | * | 5/2003 | Yin ............................. 345/211 |

FOREIGN PATENT DOCUMENTS

| | | | |
|---|---|---|---|
| JP | 4-195882 A | | 7/1992 |
| JP | 04195882 A | * | 7/1992 |
| JP | 06-038150 A | | 2/1994 |

OTHER PUBLICATIONS

Japanese Abstract No. 04195882, dated Jul. 15, 1992.

* cited by examiner

Primary Examiner—Rehana Perveen
Assistant Examiner—Tse Chen
(74) Attorney, Agent, or Firm—Sughrue Mion, PLLC (57) ABSTRACT

An electronic equipment having an electronic equipment body, and first and second operation units. The first operation unit includes a display device and a control CPU. The second operation unit includes a display device and a control CPU. The electronic equipment body includes system CPU, a power source for display device for the first operation unit, a power source for control CPU for supplying a power source to the control CPU, a power source for display device for the second operation unit, and a power source for control CPU for supplying a power source to the control CPU, and further includes a position detection part for detecting positions of the operation units. The power source for display device is cut off and then the power source for control CPU is cut off based on the positions of the first and second operation units.

9 Claims, 10 Drawing Sheets

POWER CONTROL FOR ELECTRONIC EQUIPMENT HAVING A PLURALITY OF PANELS PROVIDED OPPOSITELY BACKWARD AND FORWARD

The present disclosure relates to the subject matter contained in Japanese Patent Application No. 2001-390551 filed Dec. 21, 2001, which is incorporated herein by reference in its entirety.

BACKGROUND OF THE INVENTION

1. Field of the Invention

The present invention relates to an electronic equipment mounted in a mobile unit such as a vehicle and having a plurality of movable operation units on a front panel part thereof, particularly to a power source supply to the operation units and a control method thereof.

2. Description of the Related Art

Conventionally, various car audio apparatus such as a CD (Compact Disc) player, a DVD (Digital Versatile Disc) player, an MD (Mini Disc) player and an AM/FM tuner mounted in an instrument panel of a vehicle, and a car audio apparatus in which these are combined integrally or in which these are integrated with a navigation apparatus are used as electronic equipments. Also, there is a type having means for operating the electronic equipment by remote control.

In these car audio apparatus, operation functions tend to increase and the operation tends to become complicated, and many operation functions need be attached on an instrument panel, the area of which is limited. As a measure to this, various proposals have been made. For example, a system in which a plurality of operation units having operation keys are provided oppositely backward and forward in the front of a car audio apparatus and operation functions or display functions are distributed and provided to the respective operation units has been proposed. Further, a system for performing operation by remote control in addition to such an apparatus has been proposed.

For example, in a car audio apparatus in which two operation units are provided oppositely backward and forward in the front panel part thereof, there are a case of using only a first operation unit provided in the front of the two operation units and a case of simultaneously using a second operation unit provided in the back of the first operation unit. Further, there is a case of using an insertion opening, which is provided in the back of the second operation unit and is provided in a front panel part of an electronic equipment body, for inserting and ejecting a disk. When using the insertion opening, opening and closing operations of the two operation units are performed.

In case of using only the first operation unit, useless electric power continues to be consumed when the second operation unit is in working condition. Further, in case where a device requiring high-frequency driving is installed in the second operation unit, high-frequency noise by its driving is radiated or noise intrudes into the first operation unit through a signal line or a power source line. For example, there is a possibility that the noise travels to a metal panel constituting the first operation unit or to a circuit pattern in a circuit board provided inside the second operation unit and affects on an AM/FM tuner (hereinafter referred to as a tuner) provided in an electronic equipment body via a cabinet of the first operation unit or the pattern, causing a deterioration of the sensitivity for receiving radio waves (S/N ratio) by the tuner. In a state in which the second operation unit is in close contact with the first operation unit, affects of high-frequency noise is particularly high.

SUMMARY OF THE INVENTION

An object of the present invention is to provide an electronic equipment having a plurality of operation units provided oppositely backward and forward in a front panel part of an electronic equipment body thereof, in which a deterioration of S/N ratio in a tuner is prevented and power consumption is reduced.

According to an aspect of the present invention, there is provided an electronic equipment comprising: an electronic equipment body; and a plurality of movable operation units disposed on a front panel part of the electronic equipment body, wherein each operation unit comprises: an input operation part for inputting an operation instruction for the electronic equipment body; and a control part for controlling the operation unit, the control part is supplied with a power source from the electronic equipment body, wherein the electronic equipment body comprises: a driving part for driving the plurality of operation units; a position detection part for detecting positions of the operation units; a first power source supplier for supplying a power source to one of the operation units; a second power source supplier for supplying a power source to the other of the operation units, and a power source controller for controlling the first power source supplier and the second power source supplier.

The electronic equipment comprises the electronic equipment body and the plurality of operation units provided in the front panel part of the electronic equipment body. Each operation unit is movable by the driving part provided in the electronic equipment body. The operation unit is moved in accordance with an operation state of the electronic equipment. In one operation state, the operation unit is set in a state in which a user can easily use it. The operation unit is provided with the input operation part for operating the electronic equipment and a display device for outputting information, and also has the control part for controlling operations of the operation units when a power source is supplied from the electronic equipment body.

Also, the electronic equipment body is provided with the driving part for driving the individual operation units, the position detection part for detecting the present position or a movement state of each operation unit, and the power source supplier for supplying a power source to each operation unit. In the power source supplier, supply and cutting off of a power source to each the operation unit are individually controlled by the power source controller.

In the electronic equipment thus structured, supply and cut off of a power source regarding each operation unit can be performed based on a position and a use state of the operation units, so that power source supply to the operation unit which is not in us is stopped and occurrence of noise can be suppressed and also power consumption can be reduced.

As the electronic equipment, for example, there is electronic equipment for providing an audio reproducing apparatus for reproducing CD or MD, a radio receiving apparatus or a DVD reproducing apparatus. Further, the electronic equipment is applicable to an apparatus for providing a car navigation function. The electronic equipment body is provided with a body function part of these apparatus, namely a disk reproducing mechanism or a radio wave receiving reproducing mechanism. For example, in the disk reproducing mechanism, an opening part for inserting and ejecting a disk is provided in the front panel part of the electronic equipment body. The opening part may be used in a state in which all the operation units are moved. Also, for example, there is a tuner as an apparatus constituting the radio wave receiving reproducing mechanism. Such apparatus includes means for receiving AM, FM radio broadcast or television broadcast, navigation information sent through a navigation system.

In another aspect of electronic equipment of the invention, the other of the operation units is placed in a back of the one operation unit provided at the most distant position from the front panel part when the one operation unit is placed in front of the front panel part in a close state by the driving part, and the power source controller cuts off a power source supply to the other of the operation units when the other of the operation units is placed in the back of the one operation unit.

According to this aspect, in a state in which all the operation units are fully closed by the driving part, power sources supplied from the electronic equipment body to the other of the operation units are cut off. Therefore, occurrence of radiation noise is prevented while preventing power consumption in the operation units that are not in use.

According to another aspect of the present invention, there is provided a control method for an electronic equipment having an electronic equipment body and a plurality of movable operation units disposed in a front panel part of the electronic equipment body, the control method comprising: inputting an operation instruction for the electronic equipment body by each operation unit; controlling operation of the operation unit by supplying a power source from the electronic equipment body; driving the plurality of operation units; detecting positions of the operation units; supplying a power source to one of the operation units by a first power source supplier; supplying a power source to the other of the operation units by a second power source supplier; and controlling the first power source supplier and the second power source supplier.

The control method controls power supply and power cut off to the operation units of the electronic equipment. The electronic equipment has the electronic equipment body and the plurality of operation units provided in the front panel part of the electronic equipment body.

In the inputting step by the operation unit, an operation of the electronic equipment is input. In the controlling step, an operation of the operation unit is controlled when a power source of the operation unit is supplied from the electronic equipment body.

In the driving step, the individual operation units are moved. In the detectiing step, the present position or a movement state of each operation unit is detected. In the power source supplying step, a power source is supplied from the electronic equipment body to each operation unit. In the power source controlling step, supply and cut off of a power source to each operation unit are individually controlled.

In another aspect of a control method for an electronic equipment of the invention, the driving step includes placing the other of the operation units in a back of the one operation unit provided at the most distant position from the front panel part when the one operation unit is placed in front of the front panel part in a close state, and the power source controlling step includes cutting off a power source supplied to the other of the operation units when the other of the operation units is placed in the back of the one operation unit.

According to this aspect, in a state in which all the operation units are fully closed by the driving part, power sources supplied from the electronic equipment body to the operation units other than the operation unit in the most front position are cut off by the power source controlling step.

Such operation and other advantages of the invention will become apparent from the following embodiment.

DETAILED DESCRIPTION OF THE PREFERRED EMBODIMENTS

An electronic equipment of the invention and a control method thereof will be described with reference to FIGS. 1 to 10. The electronic equipment described herein has two operation units provided oppositely backward and forward in a front panel part of an electronic equipment body and an opening part for inserting and ejecting a disk in the front panel part of the electronic equipment body. The opening part is located in the back of the operation unit that is disposed backward. The two operation units are individually moved and have detection means for detecting an opening and closing state of each operation unit and a state capable of ejecting a disk.

Figure 1:
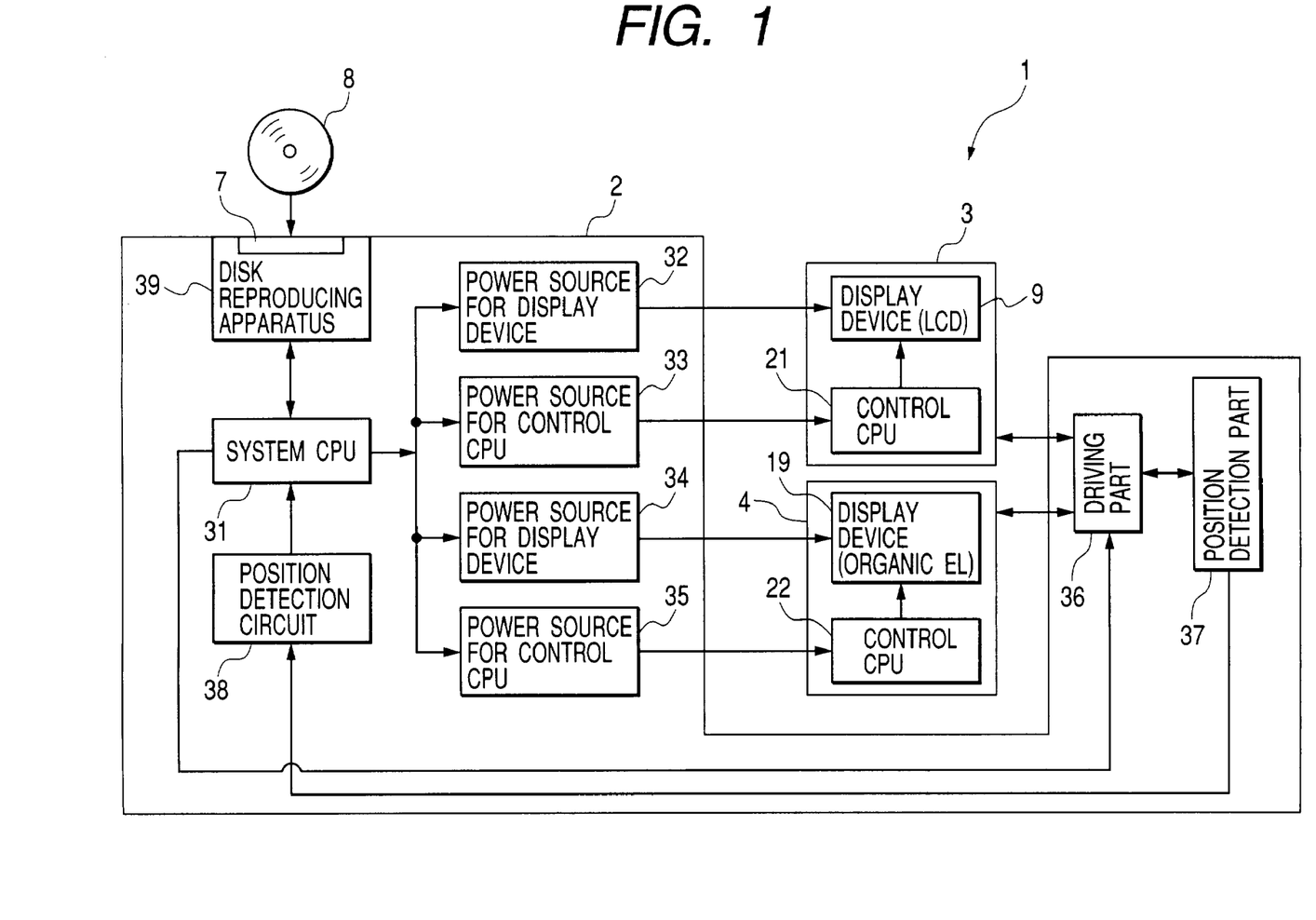
FIG. 1 is a schematic block diagram showing a configuration of an electronic equipment of the invention.

FIG. 1 is a schematic block diagram showing a configuration of an electronic equipment 1. The electronic equipment 1 comprises an electronic equipment body 2, a first operation unit 3 and a second operation unit 4. An operation unit placed forward in front of the electronic equipment body 2 is the first operation unit 3 and an operation unit placed in the back of the first operation unit 3 is the second operation unit 4.

The first operation unit 3 includes operation keys 10 (shown in FIG. 5) for operating the electronic equipment 1, a display device 9 for indicating functions or an operation state of the electronic equipment 1, and a control CPU 21 for controlling each function of the first operation unit 3 or the display device 9. As the display device 9, for example, a small LCD (Liquid Crystal Display) can be used because there are many operation keys 10 and is suitable for displaying functions or an operation state of the electronic equipment 1 simply.

The second operation unit 4 includes operation keys 17 (shown in FIG. 9) for operating the electronic equipment 1, a display device 19 for indicating functions or an operation state of the electronic equipment 1, and a control CPU 22 for controlling each function of the second operation unit 4 or the display device 19. Since main operation keys are disposed on the first operation unit 3, the number of operation keys 17 disposed on the second operation unit 4 can be reduced. Therefore, a large display device 19 having high-resolution can be used. As this display device 19, an organic EL (Electro-Luminescence) is preferably used and functions or an operation state of the electronic equipment 1 can be displayed in detail and also video can be displayed.

The electronic equipment body 2 includes a system CPU 31 for performing control of the whole electronic equipment 1, a power source for display device 32 which supplies a power to the display device 9 of the first operation unit 3, a power source for control CPU 33 which supplies a power to the control CPU 21 of the first operation unit 3, a power source for display device 34 which supplies a power to the display device 19 of the second operation unit 4, and a power source for control CPU 35 which supplies a power to the control CPU 22 of the second operation unit 4.

Also, there are provided a driving part 36 for individually moving each of the first operation unit 3 and the second operation unit 4, a position detection part 37 for detecting an opening and closing position of the first operation unit 3 and the second operation unit 4 and a position capable of ejection, and a position detection circuit 38 for making conversion into a position signal based on a signal from the position detection part 37.

Also, a disk reproducing apparatus 39 acting as a function for reproducing a disk is added to the electronic equipment body 2 as one of functions and a disk 8 is inserted into and ejected from a disk insertion opening 7. Position detection is performed by one ore more switches provided in predetermined positions. One or more arms for transmitting operation of a driving source to the first operation unit 3 and the second operation unit 4 may perform switching of the switches.

In FIG. 1, when the second operation unit 4 is closed, it is detected as a position of covering the disk insertion opening 7. When the first operation unit 3 is also placed in the front of the second operation unit 4 in a covering state, it is detected that it is in a similar position. When they are in the other state, position information corresponding to its state is output.

The operation unit is not limited to the two operation units as described above and more operation units may be used, but it is necessary to respectively provide mechanisms for individually driving those units and means capable of detecting those positions.

Next, a control method of the electronic equipment 1 will be described with reference to FIGS. 2 and 3. The method is for cutting of a power source supplied to the second operation unit 4 in state where the second operation unit 4 fully covers the disk insertion opening 7 and further the first operation unit 3 covers the second operation unit 4. That is, the electronic equipment 1 is operated in state where the second operation unit 4 cannot be visually identified from the outside. The power source cutting off may be performed to cut off a power source supplied to the control CPU 22 after cutting off a power source supplied to the display device 19.

Figure 2:
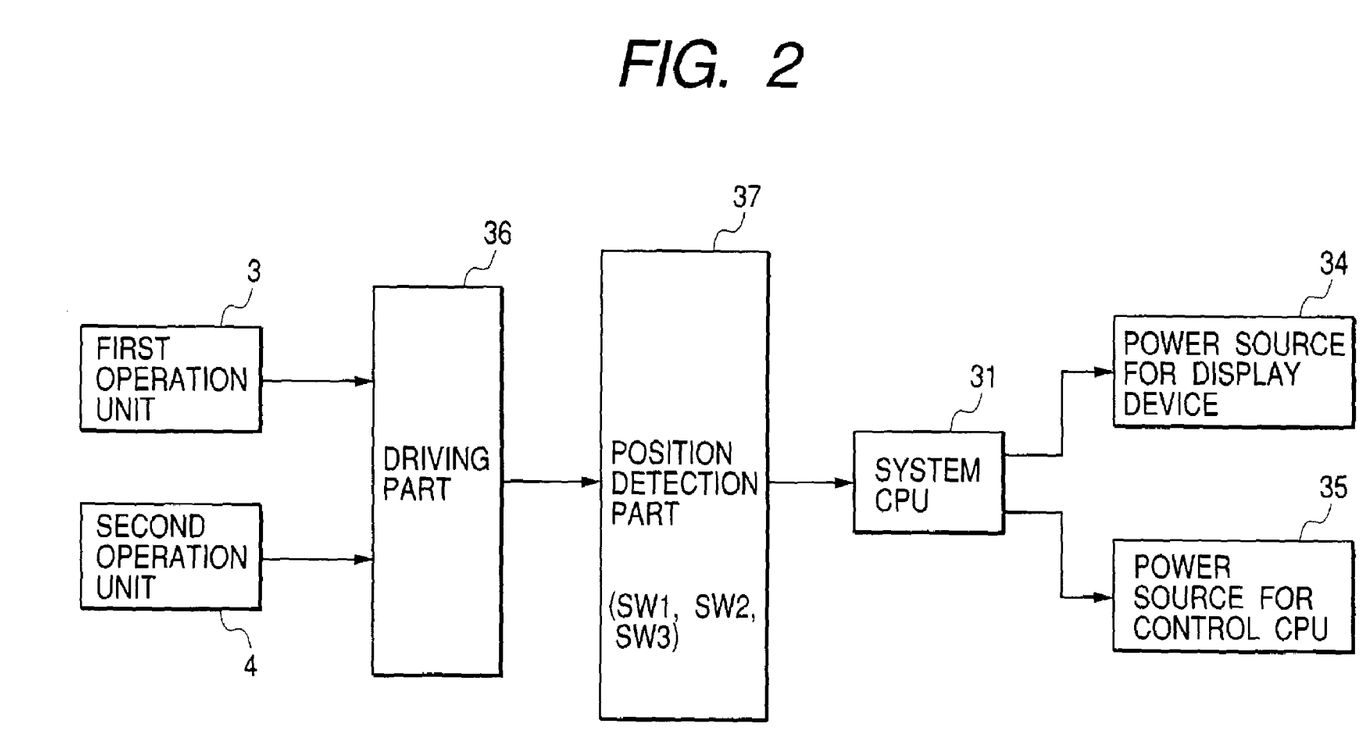
FIG. 2 is a block diagram showing a control of the electronic equipment.

As shown in FIG. 2, positions of the first operation unit 3 and the second operation unit 4 are determined by the system CPU 31 based on signals from position detection switch SW1, SW2, SW3 constituting the position detection part 37. When the system CPU 31 determines that the second operation unit 4 reaches a state of covering the disk insertion opening 7 and the first operation unit 3 reaches a state of covering the second operation unit 4, the power source for display device 34 for supplying a power source to the display device 19 of the second operation unit 4 is first cut off and the power source for control CPU 35 supplied to the control CPU 22 of the second operation unit 4 is next cut off.

Figure 3:
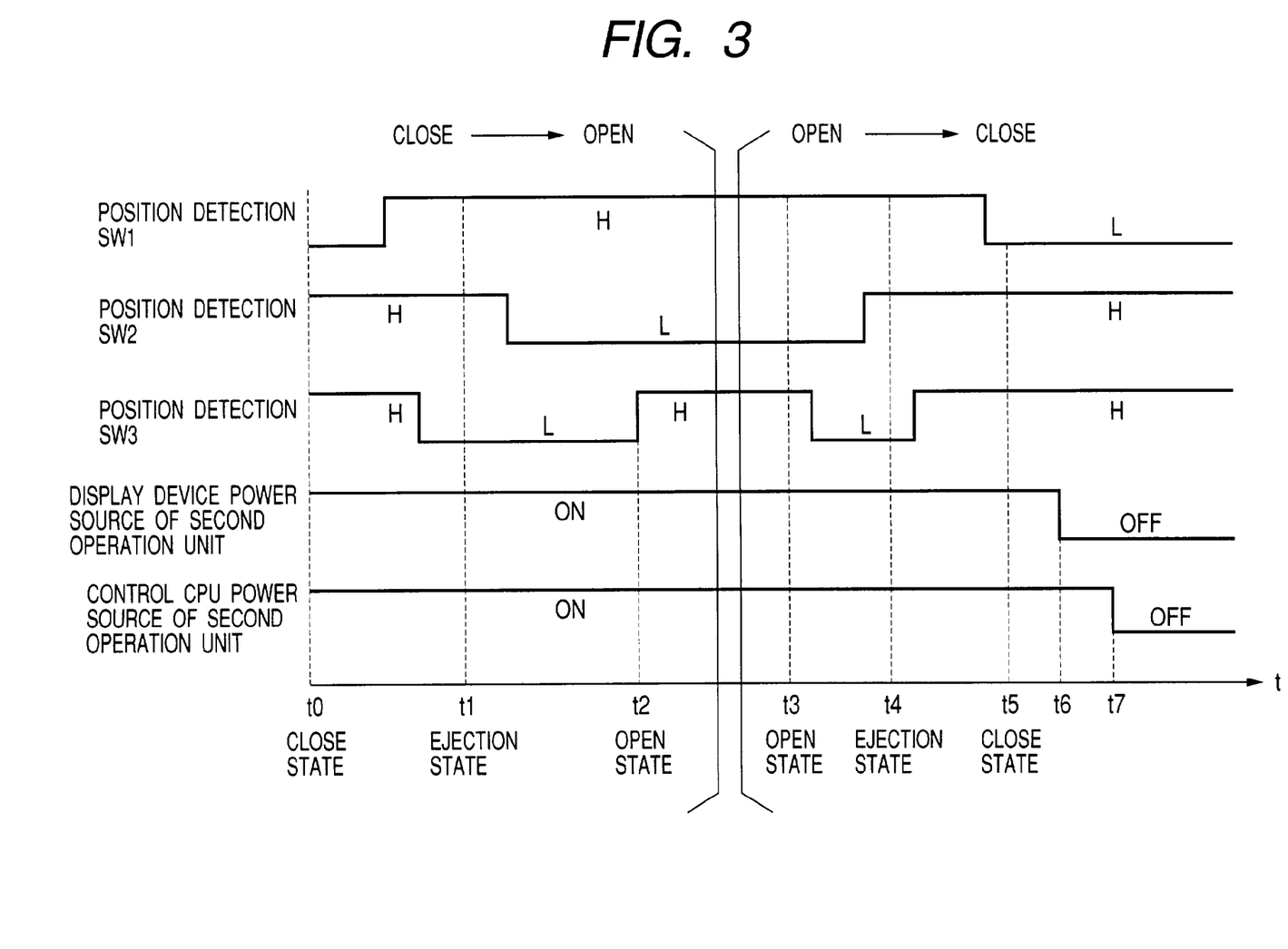
FIG. 3 is a timing chart referring to the control of the electronic equipment.

FIG. 3 is a timing chart of the control, showing an example of movement referring to the first operation unit 3 and the second operation unit 4. At time $t_0$, it is in a state (hereinafter referred to as an initial "close" state) in which the second operation unit 4 covers the disk insertion opening 7 and the first operation unit 3 covers the second operation unit 4. In the initial state, position detection SW1 is "L" and position detection SW2 is "H" and position detection SW3 is "H". Then, when it is assumed that there was an operation instruction for moving those operation units, a display device power source and a control CPU power source of the second operation unit 4 are turned on, and in order to expose the disk insertion opening 7 to the front, the first operation unit 3 and the second operation unit 4 start downward movement. At this time, the position detection SW1 shifts from "L" to "H" and outputs of the three position detection SW become "H", respectively.

Next, the first operation unit 3 and the second operation unit 4 move and at time $t_1$, the disk insertion opening 7 is fully exposed and it becomes a state capable of disk ejection (hereinafter referred to as an "ejection" state). In the ejection state, the position detection SW1 outputs "H" and the position detection SW2 outputs "H" and the position detection SW3 outputs "L".

A disk can be inserted and ejected while each of the position detection SW outputs those signals. When a command for inserting and ejecting a disk is not given while each of these position detection SW outputs this signal, movement of the first operation unit 3 and the second operation unit 4 are restarted after a lapse of predetermined time.

When the second operation unit 4 starts upward movement from the ejection state, the position detection SW2 shifts from "H" to "L". The second operation unit 4 moves upward and the first operation unit 3 moves downward. Then, the second operation unit 4 continues to move upward and stops after becoming a state of fully covering the disk insertion opening 7 (time $t_2$) and movement of the first operation unit 3 also stops. At this time, an output of the position detection SW1 becomes "H" and an output of the position detection SW2 becomes "L" and an output of the position detection SW3 becomes "H", and the disk insertion opening 7 is covered with the second operation unit 4 and it becomes a state in which the first operation unit 3 is separated from the second operation unit 4 (hereinafter referred to as an "open" state).

Next, when it is assumed that an operation instruction is given in order to return the first operation unit 3 and the second operation unit 4 from the open state to an initial state at time $t_3$, the second operation unit 4 moves downward and the first operation unit 3 moves upward. At this time, an output of the position detection SW3 shifts from "H" to "L" and the position detection SW1 outputs "H" and the position detection SW2 outputs "L", respectively.

Then, when it becomes the ejection state at time $t_4$, the position detection SW2 shifts from "L" to "H" and the position detection SW1 outputs "H" and the position detection SW3 outputs "L". When the second operation unit 4 starts upward movement from the ejection state, the position detection SW3 shifts from "L" to "H". The second operation unit 4 moves upward and the first operation unit 3 moves upward.

Then, the second operation unit 4 continues to move upward and stops after shifting to a state of fully covering the disk insertion opening 7 (time $t_5$) and movement of the first operation unit 3 also stops after shifting to a state (close state) of covering the second operation unit 4. At this time, an output of the position detection SW1 shifts from "H" to "L" and the position detection SW2 outputs "H" and the position detection SW3 outputs "H".

As above described, positions of the first operation unit 3 and the second operation unit 4 can be detected by the three position detection SW. That is, it is determined as the initial state when the position detection SW1 is "L", the position detection SW2 is "H" and the position detection SW3 is "H". Also, it is determined as the ejection state when the position detection SW1 is "H", the position detection SW2 is "H" and the position detection SW3 is "L". Further, it is determined as the open state when the position detection SW1 is "H", the position detection SW2 is "L" and the position detection SW3 is "H".

According to a control of the invention, in case where an output of the position detection SW1 is "L" and an output of the position detection SW2 is "H" and an output of the position detection SW3 is "H", that is, the second operation unit 4 fully covers the disk insertion opening 7 in the original state and the first operation unit 3 fully covers the second operation unit 4, a power source supplied to the display device 19 of the second operation unit 4 is cut off and subsequently a power source supplied to the control CPU 22 is cut off. Therefore, a display device power source of the second operation unit is turned off at time $t_6$, and then a control CPU power source of the second operation unit is turned off at time $t_7$ after a lapse of predetermined time.

A relation between the output of each the position detection SW and the first operation unit 3, the second operation unit 4 and control of electric power cut off is described above, but it is not limited to such a case. When outputs of the position detection SW1, SW2, SW3 become "L", "H", "H", it may be determined that the second operation unit 4 is not working, and electric power to the second operation unit 4 may be cut off.

Next, a flow of the control will be described. As shown in a flowchart of FIG. 4, first, it is determined whether or not an operation input for returning the first operation unit 3 and the second operation unit 4 to an initial state has been given (step S101). When the input has not been given, the flow returns to step S101 and waits until the input is made. When the input has been given, the first operation unit 3 and the second operation unit 4 are moved and an operation for returning them to the initial state is started (step S102).

Figure 4:
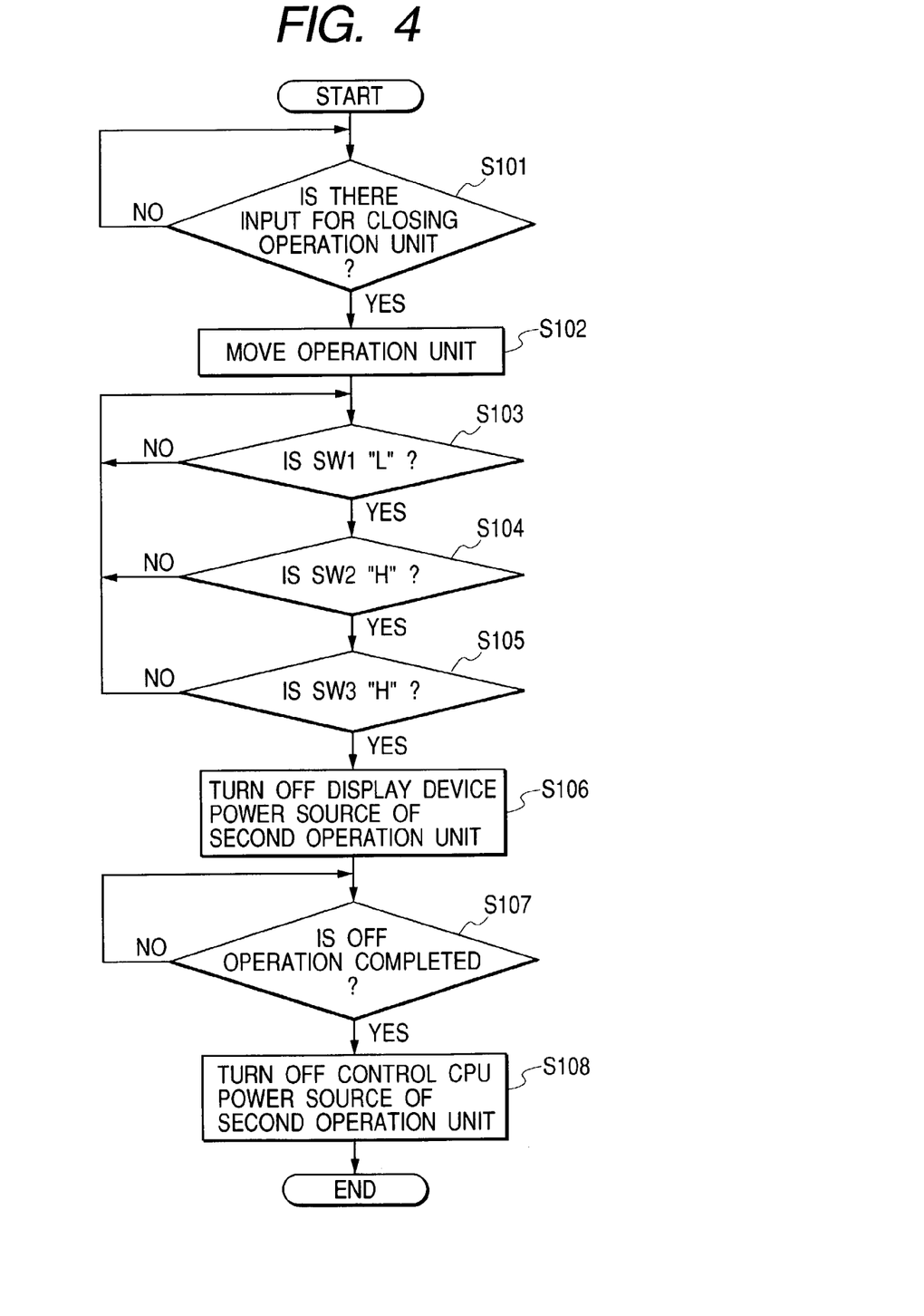
FIG. 4 is a flowchart showing a flow of the control of the electronic equipment.

Next, it is determined whether or not an output of the position detection SW1 is "L" (step S103). When it is not "L", the flow returns to step S103 and when it is "L", it is then determined whether or not an output of the position detection SW2 is "H" (step S104). When it is not "H", the flow returns to step S103 and it is again checked from the output of the position detection SW1. On the other hand, when SW2 is "H", it is then determined whether or not an output of the position detection SW3 is "H" (step S105). When it is not "H", the flow returns to step S103 and it is again checked from the output of the position detection SW1.

When the output of the position detection SW3 is "H", the second operation unit 4 is in the initial state and the power source 34 for display device of the second operation unit 4 is turned off (step S106). After confirming the OFF of the power source for display device 34 (step S107), the power source 35 for control CPU of the second operation unit 4 is turned off (step S108) and the control is ended.

The flow of control is not limited to the above flow, and any flow may be adopted as long as it embodies the technical idea of the invention.

As described above, in a state in which the second operation unit 4, which is not in use, fully covers the disk insertion opening 7 and the first operation unit 3 covers the second operation unit 4, by cutting off a power source of the second operation unit 4, a reduction in an S/N ratio due to radiation noise to a tuner provided in the electronic equipment body 2 can be prevented and also power consumption can be reduced. Particularly, when the second operation unit 4 includes a large organic EL display device having high-resolution, the effect is large.

Also, by cutting off a power source supplied to the control CPU 22 after cutting off a power source supplied to the display device 19, an error of initial setting to the display device 19 or error display is prevented.

Next, a configuration of an electronic equipment according to an embodiment of the invention will be described with reference to FIGS. 5 to 10. A relation between the timing chart of FIG. 3 and the flowchart of FIG. 4 will be associated and will be described properly.

Figure 5:
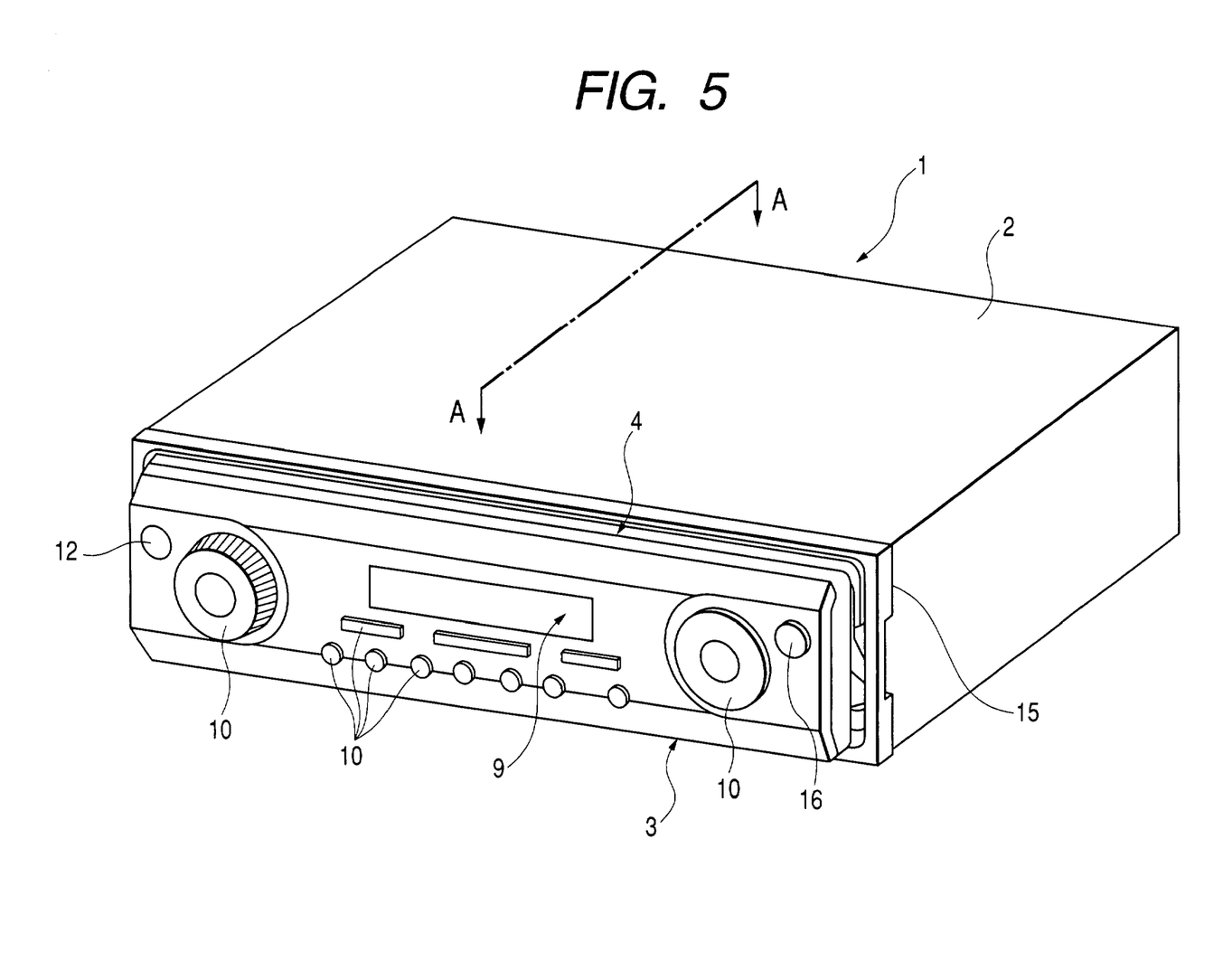
FIG. 5 is a perspective view showing a configuration of the electronic equipment used in an electronic equipment control system.

As shown in FIG. 5, in an electronic equipment 1, two operation units (a first operation unit 3 and a second operation unit 4) for operating the electronic equipment 1 are placed oppositely backward and forward in a front panel part 15 of an electronic equipment body 2 with the first operation unit 3 placed in the front and the second operation unit 4 placed in the back.

Figure 9:
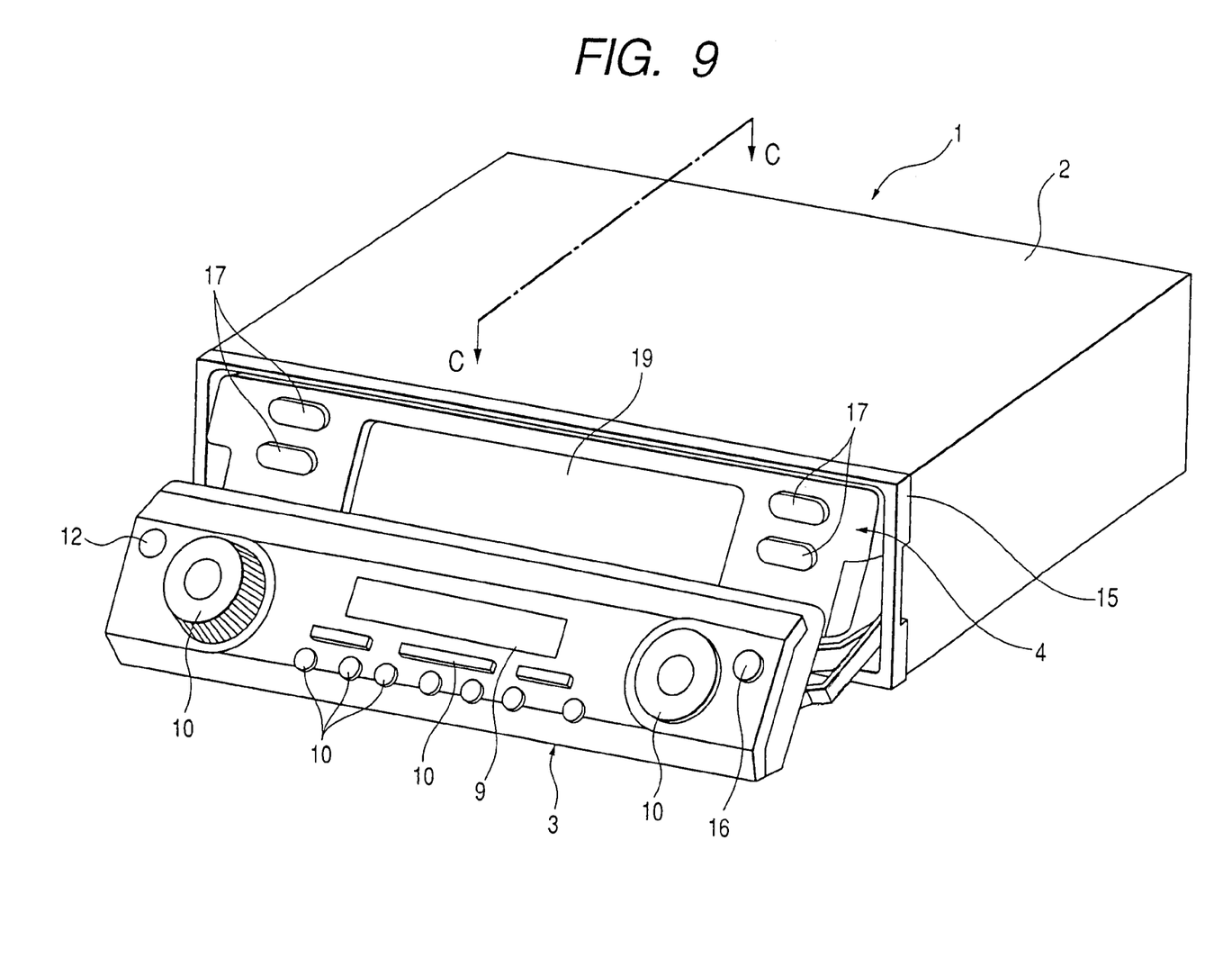
FIG. 9 is a perspective view showing a state of the electronic equipment subsequent to a state of FIG. 7.

The front face of the first operation unit 3 is provided with a display device 9, various operation keys 10, a light receiving part 12 and an open/close key 16. The second operation unit 4 is provided with operation keys 17 and a display device 19 as shown in FIG. 9.

The display device 9 of the first operation unit 3 displays functions and an operation state of the electronic equipment 1. The operation keys 10 are input keys for operating the electronic equipment 1. The light receiving part 12 is a portion for receiving a signal by infrared rays from a remote control terminal. The open/close key 16 is an input key for opening and closing the first operation unit 3 and the second operation unit 4 by operating this key.

The operation keys 17 of the second operation unit 4 are input keys for operating the electronic equipment 1. The display device 19 has a function of displaying detailed description in addition to functions and an operation state of the electronic equipment 1.

As display means, for example, an LCD is preferably used for the display device 9, and an organic EL is preferably used for the display device 19.

By providing the two operation units of the first operation unit 3 and the second operation unit 4, many operation keys 10, 17 can be placed in a limited space of a vehicle instrument panel, for example. Also, a large display device 19 having high-resolution can be provided in a vehicle-mounted electronic equipment, for example. When using the second operation unit 4, the first operation unit 3 moves to a predetermined position and the second operation unit 4 is well visible to a user as described in detail below. Also, more operation units can be provided without being limited to the two operation units.

Also, the electronic equipment 1 is provided with various components for performing the functions, such as a CD reproducing mechanism, an MD reproducing mechanism, and CD, MD holding parts for an audio reproducing apparatus, a tuner for receiving an AM/FM broadcast radio wave and demodulating means for making conversion from a received radio wave to an audio signal for a radio receiving apparatus, a channel tuner for receiving a video radio wave and demodulating means for demodulating a video signal or an audio signal from a received radio wave for a television, and further a function of a DVD apparatus. The display device 19 of the second operation unit 4 can also be used in video display of television.

Next, one example of a configuration of the first operation unit 3 and the second operation unit 4 of the electronic equipment 1 and its operation will be described.

Figure 6:
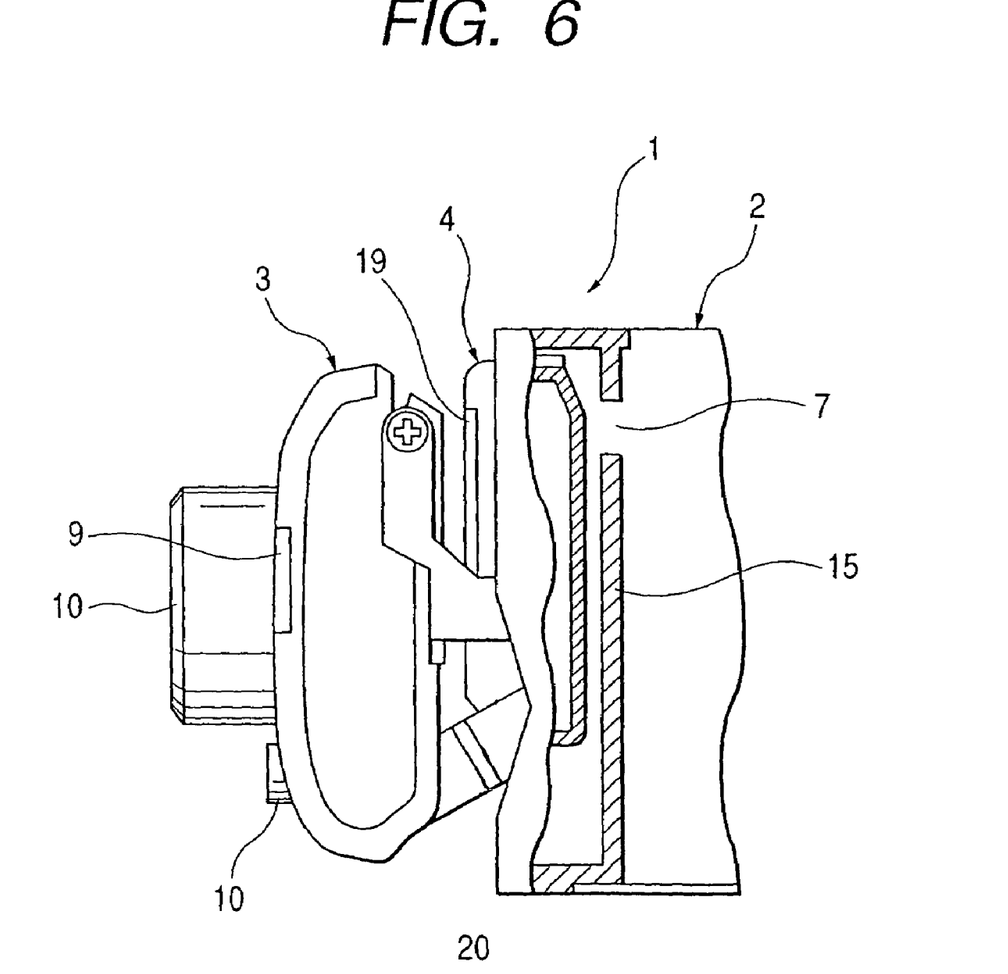
FIG. 6 is a partially sectional side view taken along line A—A of FIG. 5.

FIG. 5 is an initial state of the electronic equipment 1, and FIG. 6 is a sectional side view taken along line A—A of FIG. 5. As can be seen from FIG. 6, in this state, the first operation unit 3 and the second operation unit 4 are placed in the front panel part 15 so as to overlap with each other, the first operation unit 3 placed in the front. These units are placed in a close contact state. In case where an organic EL is used as the display device 19 of the second operation unit 4, radiation noise due to driving of the display device 19 has an influence on a tuner provided in the electronic equipment body 2 and it becomes a cause of reducing a S/N ratio.

At the time $t_0$ in FIG. 3, a user operates the operation keys 10 of the first operation unit 3 or receives a transmitted signal from a remote control terminal by the light receiving part 12, and thereby movement of the first operation unit 3 and the second operation unit 4 is started and it becomes a state in which the disk insertion opening 7 is exposed at the time $t_1$ in FIG. 3.

Figure 7:
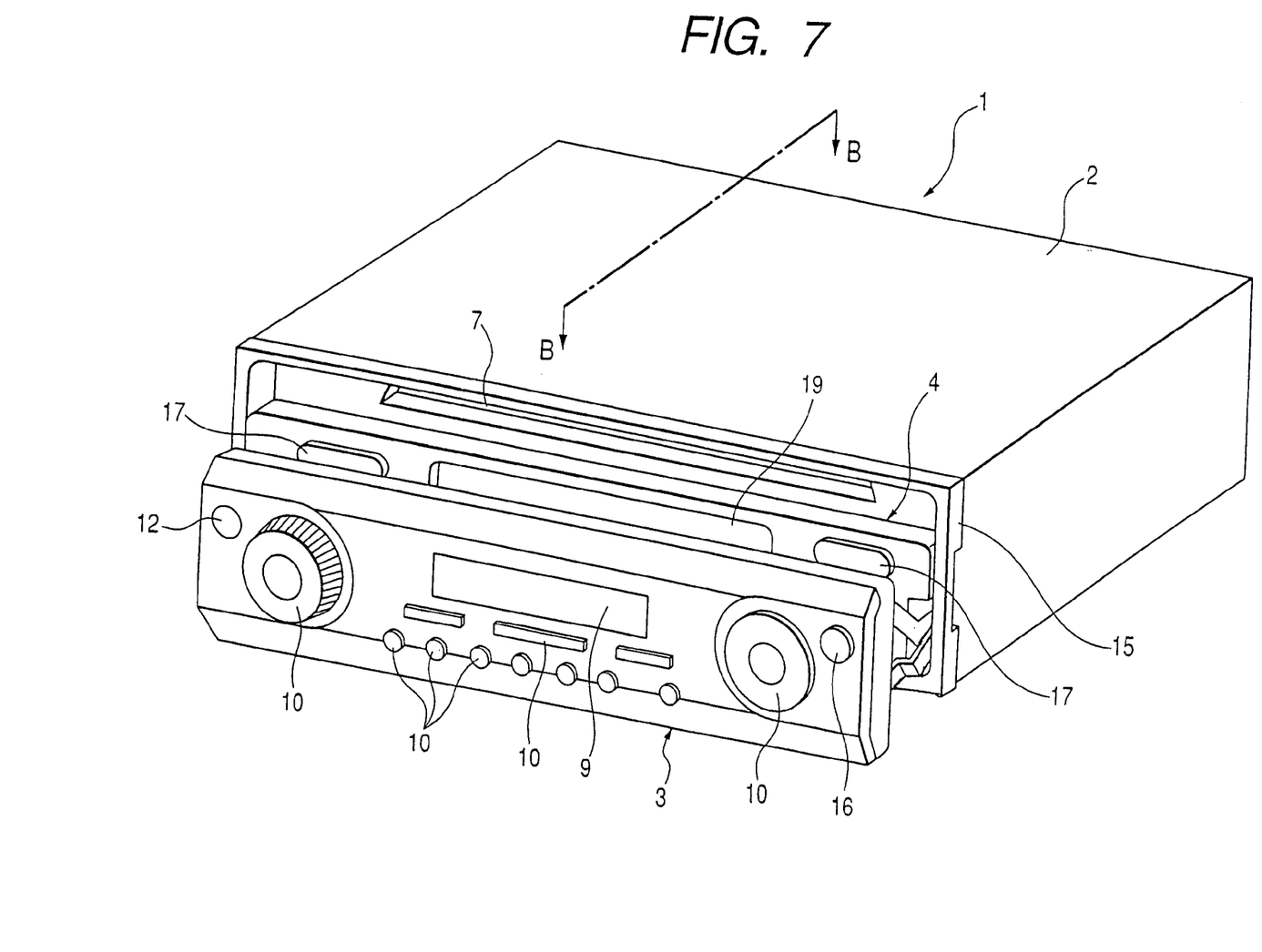
FIG. 7 is a perspective view showing a stat of the electronic equipment subsequent to a state of FIG. 5.
Figure 8:
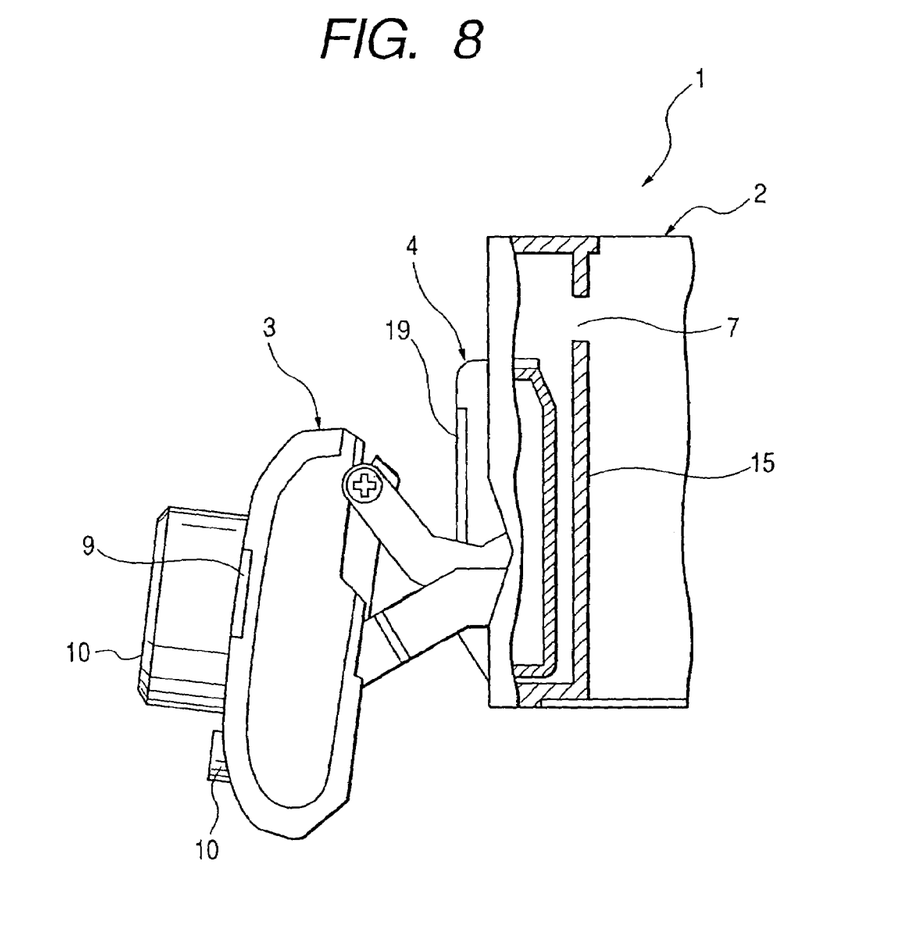
FIG. 8 is a partially sectional side view taken along line B—B of FIG. 7.

FIG. 7 shows a state in which the disk insertion opening 7 is exposed at the time $t_1$ and is a state capable of inserting and ejecting a disk. FIG. 8 is a sectional side view taken along line B—B of FIG. 7. In this state, an output of the position detection SW1 becomes "H" and an output of the position detection SW2 becomes "H" and an output of the position detection SW3 becomes "L".

Figure 10:
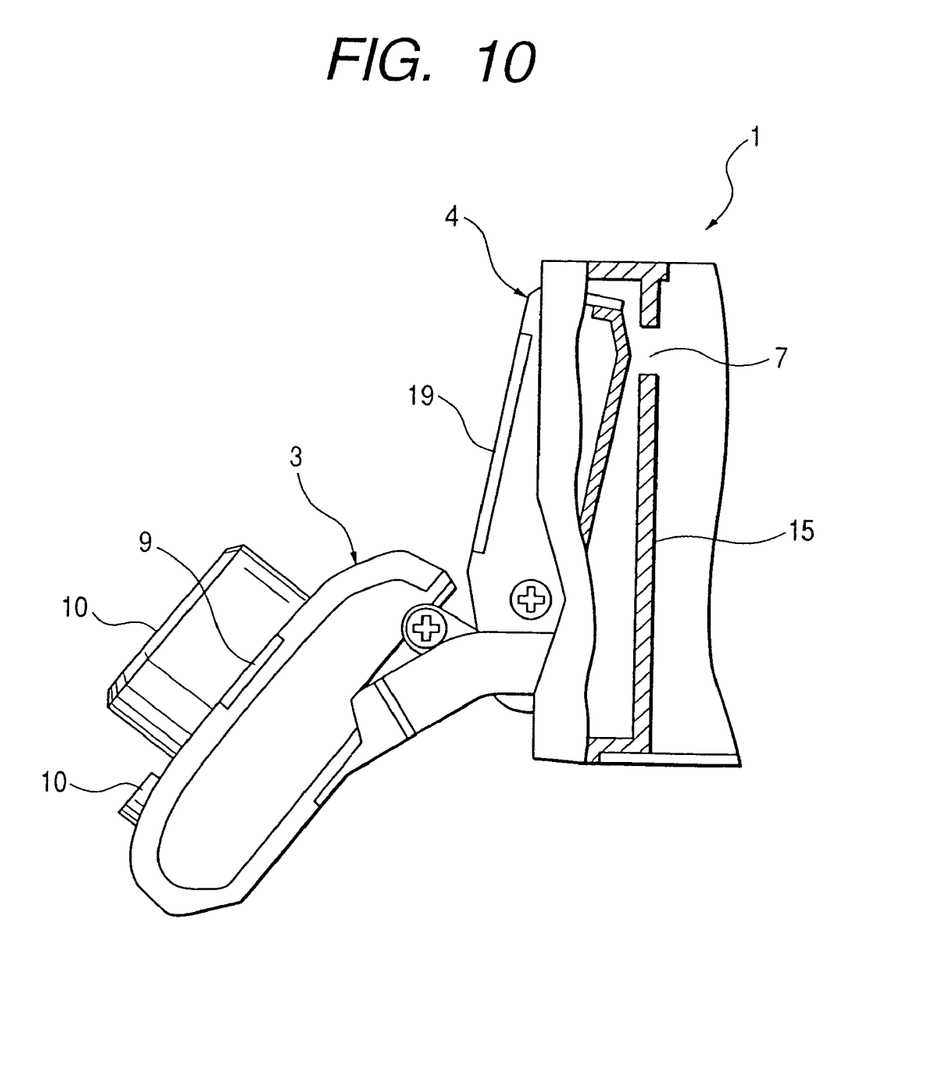
FIG. 10 is a partially sectional side view taken along line C—C of FIG. 9.

FIG. 9 is a state in which, for example, after completing disk ejection, the second operation unit 4 rises again to cover the disk insertion opening 7 and is set in a slant state so that a user can easily see (at the time $t_2$ in FIG. 3) and the display device 19 is working. FIG. 10 is a sectional side view taken along line C—C of FIG. 9.

In the state shown in FIG. 9, the first operation unit 3 is in a position separated from the second operation unit 4, so that the display device 19 has a small influence of radiation noise. When an operation for closing the first operation unit 3 and the second operation unit 4 is performed by a user at the time $t_4$ in FIG. 3 from this state, the closing operation is ended at the time $t_5$ in FIG. 3 and it returns to the state shown in FIG. 5.

In this state, as can be seen from FIG. 6, the display device 19 and the first operation unit 3 is in close contact with each other and an electromagnetic wave influence of the display device 19 becomes large. In order to prevent this, the power source for display device 34 installed in the electronic equipment body 2 is cut off, then the power source for control CPU 35 is cut off. In this way, an operation of the display device 19 and an operation of the control CPU 22 are stopped sequentially.

The system described above is not limited to an electronic equipment for handling audio, and may be used in an electronic equipment for handling video. Also, it is not limited to vehicle-mounted equipment, and may be applied to an electronic equipment for home use.

Also, the invention is not limited to the embodiment described above, and can be changed properly without departing from the claims and the subject matter or the idea of the invention capable of being read from the whole specification, and electronic equipment with such a change and a control method thereof are also included in the technical idea of the invention.

As described above, according to an electronic equipment of the invention and a control method thereof, by detecting that two operation units are held in the front panel part of the electronic equipment body, detecting that the operation unit in the back is not in use and turning off a power source of this back operation unit, occurrence of radiation noise is eliminated and performance deterioration such as sensitivity deterioration at the time of tuner receiving can be prevented.

Also, by turning off a power source of the operation unit which is not in use, power consumption can be reduced.

What is claimed is:

1. An electronic audio equipment comprising:
an electronic equipment body; and
a plurality of movable operation units disposed on a front panel part of the electronic equipment body, wherein each operation unit comprises:
an input operation part for inputting an operation instruction for the electronic equipment body; and
a control part for controlling the operation unit, the control part is supplied with a power source from the electronic equipment body, wherein the electronic equipment body comprises:
a driving part for driving the plurality of operation units;
a position detection part for detecting positions of the operation units;
a first power source supplier for supplying a power source to a first of the operation units;
a second power source supplier for supplying a power source to a second of the operation units; and
a power source controller for controlling the first power source supplier and the second power source supplier;
wherein power source control is based on position or use state of the first and the second of the operation units;
wherein the second of the operation units is placed in a back of the first of the operation units provided at the most distant position from the front panel part when the first of the operation units is placed in front of the front panel part in a close state by the driving part, and
wherein the power source controller cuts off a power source supply to the second of the operation units when the second of the operation units is placed in the back of the first of the operation units.

2. A control method for an electronic audio equipment having an electronic equipment body and a plurality of movable operation units disposed in a front panel part of the electronic equipment body, the control method comprising:
inputting an operation instruction for the electronic equipment body by each operation unit;
controlling operation of each operation unit by supplying a power source from the electronic equipment body;
driving the plurality of operation units;
detecting positions of the operation units;
supplying a power source to a first of the operation units by a first power source supplier;
supplying a power source to a second of the operation units by a second power source supplier; and
controlling the first power source supplier and the second power source supplier;
wherein power source control is based on position or use state of the first and the second of the operation units;

wherein during driving of the plurality of operation units, the second of the operation units is placed in a back of the first of the operation units provided at the most distant position from the front panel part when the first of the operation units is placed in front of the front panel part in a closed state, and wherein the controlling of the first power source supplier and the second power source supplier includes cutting off a power source supplied to the second of the operation units when the second of the operation units is placed in the back of the first of the operation units.

3. An electronic audio equipment according to claim 1, wherein the first power source supplier supplies a plurality of voltage levels to the first of the operation units.

4. An electronic audio equipment according to claim 3, wherein the first of the operation units further comprises a display part; and wherein the first power source supplier supplies a first voltage level to a control part of the first operation unit and supplies a second voltage level to the display part.

5. An electronic audio equipment according to claim 4, wherein based on a predetermined position or use state of the first and the second of the operation units, the first power source supplier turns off the second voltage level supplied to the display part and thereafter turns off the first voltage level supplied to the control part of the first operation unit.

6. An electronic audio equipment according to claim 1, wherein the first power source supplier further comprises a plurality of power sources.

7. An electronic audio equipment according to claim 6, wherein the first power source supplier further comprises:

a first power source for a display part of the first operation unit; and a second power source for a control part of the first operation unit.

8. An electronic audio equipment according to claim 7, wherein the first power source for the display part of the first operation unit supplies a first voltage level to the display part of the first operation unit; and wherein the second power source for the control part of the first operation unit supplies a second voltage level to the control part of the first operation unit.

9. An electronic audio equipment according to claim 8, wherein based on a predetermined position or use state of the first and the second of the operation units, the first power source supplier turns off the first voltage level supplied to the display part of the first operation unit and thereafter turns off the second voltage level supplied to the control part of the first operation unit.

* * * * *